(12) United States Patent
Shin

(10) Patent No.: US 12,148,904 B2
(45) Date of Patent: Nov. 19, 2024

(54) BATTERY MODULE, AND BATTERY PACK AND VEHICLE COMPRISING SAME

(71) Applicant: LG Energy Solution, Ltd., Seoul (KR)

(72) Inventor: Seung-Won Shin, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 481 days.

(21) Appl. No.: 17/615,316

(22) PCT Filed: Jul. 20, 2020

(86) PCT No.: PCT/KR2020/009560
§ 371 (c)(1),
(2) Date: Nov. 30, 2021

(87) PCT Pub. No.: WO2021/107319
PCT Pub. Date: Jun. 3, 2021

(65) Prior Publication Data
US 2022/0223931 A1    Jul. 14, 2022

(30) Foreign Application Priority Data
Nov. 28, 2019   (KR) .......................  10-2019-0155856

(51) Int. Cl.
| | |
|---|---|
| H01M 10/613 | (2014.01) |
| H01M 10/48 | (2006.01) |
| H01M 10/60 | (2014.01) |
| H01M 10/625 | (2014.01) |
| H01M 10/6562 | (2014.01) |

(52) U.S. Cl.
CPC ....... H01M 10/613 (2015.04); H01M 10/486 (2013.01); H01M 10/60 (2015.04); H01M 10/625 (2015.04); H01M 10/6562 (2015.04); H01M 2220/20 (2013.01)

(58) Field of Classification Search
CPC ........................... H01M 10/60; H01M 10/613
See application file for complete search history.

(56) References Cited

U.S. PATENT DOCUMENTS

| | | |
|---|---|---|
| 5,326,937 A | 7/1994 | Watanabe |
| 6,472,098 B1 | 10/2002 | Sawada et al. |
| 10,555,431 B2 | 2/2020 | Perales et al. |

(Continued)

FOREIGN PATENT DOCUMENTS

| | | | |
|---|---|---|---|
| CN | 206022472 U | * | 3/2017 |
| CN | 107105584 A | | 8/2017 |

(Continued)

OTHER PUBLICATIONS

Extended European Search Report including Written Opinion for Application No. 20892149.4 dated Aug. 4, 2022, pp. 1-7.

(Continued)

Primary Examiner — Amanda C. Walke
(74) Attorney, Agent, or Firm — Lerner David LLP

(57) ABSTRACT

A battery module, and a battery pack and a vehicle including the battery module, includes a battery cell stack in which a plurality of battery cells are stacked, a case configured to accommodate the battery cell stack, a circuit board disposed at the case, a mounting hole formed in the circuit board so that a fastening member is inserted therein to fix the circuit board, and an expansion hole configured to extend from the mounting hole.

14 Claims, 5 Drawing Sheets

(56) References Cited

U.S. PATENT DOCUMENTS

| | | |
|---|---|---|
| 2010/0173189 A1 | 7/2010 | Suzuki |
| 2013/0175915 A1 | 7/2013 | Yang |
| 2017/0245381 A1 | 8/2017 | Briquet |

FOREIGN PATENT DOCUMENTS

| | | | |
|---|---|---|---|
| CN | 206558577 U | * | 10/2017 |
| CN | 206568295 U | | 10/2017 |
| CN | 108702839 A | | 10/2018 |
| CN | 117096544 A | * | 11/2023 |
| EP | 1006597 A2 | | 6/2000 |
| EP | 2581964 A1 | | 4/2013 |
| JP | S60190051 U | | 12/1985 |
| JP | H5206601 A | | 8/1993 |
| JP | H09270262 A | | 10/1997 |
| JP | 2000184644 A | | 6/2000 |
| JP | 2000228178 A | | 8/2000 |
| JP | 2002313300 A | | 10/2002 |
| JP | 2010160931 A | | 7/2010 |
| JP | 3162780 U | | 9/2010 |
| JP | 2012028171 A | | 2/2012 |
| JP | 2013089382 A | | 5/2013 |
| JP | 2018085219 A | | 5/2018 |
| KR | 20100081956 A | | 7/2010 |
| KR | 20130081669 A | | 7/2013 |
| KR | 20150089481 A | | 8/2015 |
| KR | 20160055664 A | | 5/2016 |
| KR | 20190007743 A | | 1/2019 |

OTHER PUBLICATIONS

International Search Report for PCT/KR2020/009560 dated Oct. 27, 2020. 2 pgs.

Search Report dated Jun. 27, 2024 from the Office Action for Chinese Application No. 202080048743.X issued Jun. 29, 2024, 3 pages.

* cited by examiner

BATTERY MODULE, AND BATTERY PACK AND VEHICLE COMPRISING SAME

CROSS-REFERENCE TO RELATED APPLICATIONS

The present application is a national phase entry under 35 U.S.C. § 371 of International Application No. PCT/KR2020/009560 filed Jul. 20, 2020, published in Korean, which claims priority from Korean Patent Application No. 10-2019-0155856 filed Nov. 28, 2019, all of which are incorporated herein by reference.

TECHNICAL FIELD

The present disclosure relates to a battery module, and a battery pack and a vehicle including the battery module, and more particular, to a battery module, which may cool a circuit board through an expansion hole extending from a mounting hole, and a battery pack and a vehicle including the battery module.

BACKGROUND ART

As technology development and demand for a mobile device have increased, demand for a secondary battery as an energy source has rapidly increased. Conventionally, a nickel-cadmium battery or a hydrogen ion battery has been used as the secondary battery. However, a lithium secondary battery is recently widely used because charging and discharging is free due to rare memory effect in comparison with a nickel-based secondary battery, a self-discharge rate is very low, and an energy density is high.

The lithium secondary battery mainly uses a lithium oxide and a carbonaceous material as a positive electrode active material and a negative electrode active material, respectively. The lithium secondary battery includes an electrode assembly in which a positive electrode plate and a negative electrode plate, respectively coated with the positive electrode active material and the negative electrode active material, are arranged with a separator therebetween, and an exterior, that is a battery case, which seals and receives the electrode assembly together with an electrolyte solution.

The lithium secondary battery includes a positive electrode, a negative electrode, and a separator interposed therebetween and an electrolyte. Depending on which material is used for the positive electrode active material and the negative electrode active material, the lithium secondary battery is classified into a lithium ion battery (LIB) and a polymer lithium ion battery (PLIB). Generally, an electrode of the lithium secondary battery is prepared by applying the positive or negative electrode active material to a current collector made of aluminum or copper sheet, mesh, film, foil, or the like and then drying the same.

A battery module may be configured by stacking secondary batteries, namely battery cells, and the battery module may include a bus bar, a relay, a circuit board, and the like to electrically connect the battery cells and sense and control temperature.

Here, the circuit board is coupled to the case using a fastening member or the like, and a mounting hole for coupling the circuit board to the case is formed in the circuit board.

FIG. 1 is a diagram schematically showing a circuit module of a conventional battery module. FIG. 1 corresponds to FIG. 4 of Korean Unexamined Patent Publication No. 10-2015-0089481 (hereinafter, referred to as a prior literature).

Referring to FIG. 1, a via hole 2 is formed in a printed circuit board 1. Seeing the prior literature, if a secondary battery protection circuit module including at least one via hole 2 vertically perforated in the printed circuit board 1 is used, an abnormal heating state and an abnormal temperature state of the protection circuit module may be accurately detected.

Here, referring to FIG. 1, since a fuse 3 closes the via hole 2 entirely, air may not flow through the via hole 2. In other words, in the prior literature, the via hole 2 is not intended to allow air to flow therethrough, but it is intended that an abnormal heating state is accurately detected through the via hole 2 so that the fuse 3 is quickly destroyed.

Therefore, in the prior literature, although the electrical connection may be cut by means of the fuse 3 when the temperature of the printed circuit board 1 rises, it is not possible to cool the printed circuit board 1 through the via hole 2 when the temperature of the printed circuit board 1 rises.

SUMMARY

Technical Problem

The present disclosure is directed to providing a battery module, which may cool a circuit board when the temperature of the circuit board rises, and a battery pack and a vehicle including the battery module.

Technical Solution

In one aspect of the present disclosure, there is provided a battery module, comprising: a battery cell stack in which a plurality of battery cells are stacked; a case configured to accommodate the battery cell stack; a circuit board disposed at the case; a mounting hole formed in the circuit board and configured to receive a fastening member therein to fix the circuit board to the case; and an expansion hole formed in the circuit board and extending from the mounting hole.

Also, the expansion hole may be a perforated hole formed to perforate an area of the circuit board around the mounting hole entirely.

In addition, the fastening member may be a screw, and the mounting hole and expansion hole may be configured such that, when a screw body of the screw is inserted into and fastened to the mounting hole, at least a part of the expansion hole may be not covered by a screw head of the screw.

Also, the battery module may include a plurality of expansion holes that extend radially from the mounting hole.

In addition, the expansion hole may include: a first hole portion extending from the mounting hole; and a second hole portion extending from the first hole and having a different width than the first hole.

Also, the first hole portion may be formed to have a smaller width than the second hole portion.

In addition, a length direction of the expansion hole extends radially from the mounting hole, the first hole portion may have a smaller length than the second hole portion in the length direction.

Also, an outer edge of the first hole portion may be positioned radially inward from an outer edge of the screw head and an outer edge of the second hole portion is positioned radially outward from the outer edge of the screw head.

Also, the battery module may further include the fastening member.

In addition, the battery module may further include a plurality of mounting holes, each mounting hole including one or more corresponding expansion holes.

Also, the battery module may include a mounting hole and one or more corresponding expansion holes at each corner of the circuit board.

In addition, the expansion hole may be configured to permit air to flow therethrough while the circuit board is fixed to the case by the fastening member.

Meanwhile, in another aspect the present disclosure, there is also provided a battery pack, comprising the battery module described in any of the embodiments herein, and a vehicle, comprising the battery module described in any of the embodiments herein.

Advantageous Effects

In the embodiments of the present disclosure, since an expansion hole extending from the mounting hole is formed, when the temperature of the circuit board rises, the circuit board may be cooled by air flowing through the expansion hole.

DETAILED DESCRIPTION

Figure 1:
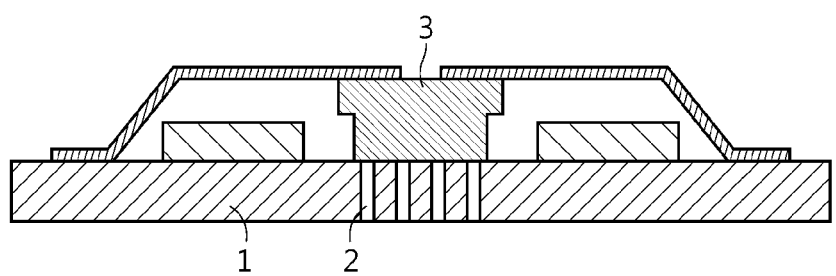
FIG. 1 is a diagram schematically showing a circuit module of a conventional battery module.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In the drawings, the size of each element or a specific part of the element may be exaggerated, omitted, or schematically illustrated for convenience and clarity of a description. Thus, the size of each element does not entirely reflect the actual size of the element. A detailed description of well-known functions or elements associated with the present disclosure will be omitted if it unnecessarily obscures the subject matter of the present disclosure.

The term, 'coupling' or 'connecting' as used herein, may refer not only to a case where one member and another member are directly combined or directly connected but also a case where one member is indirectly combined with another member via a connecting member or is indirectly connected.

Figure 2:
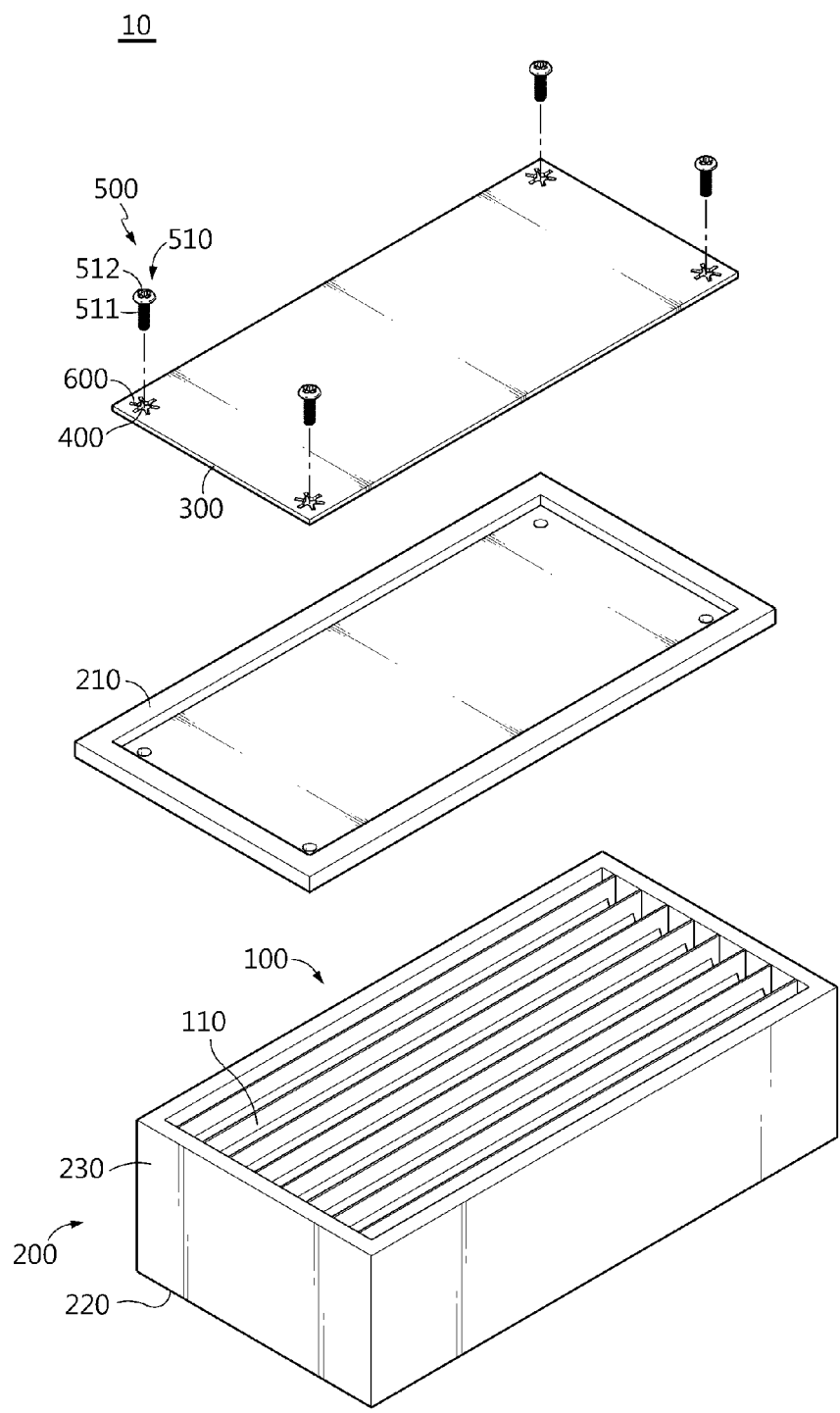
FIG. 2 is an exploded perspective view schematically showing a battery module according to an embodiment of the present disclosure.
Figure 3:
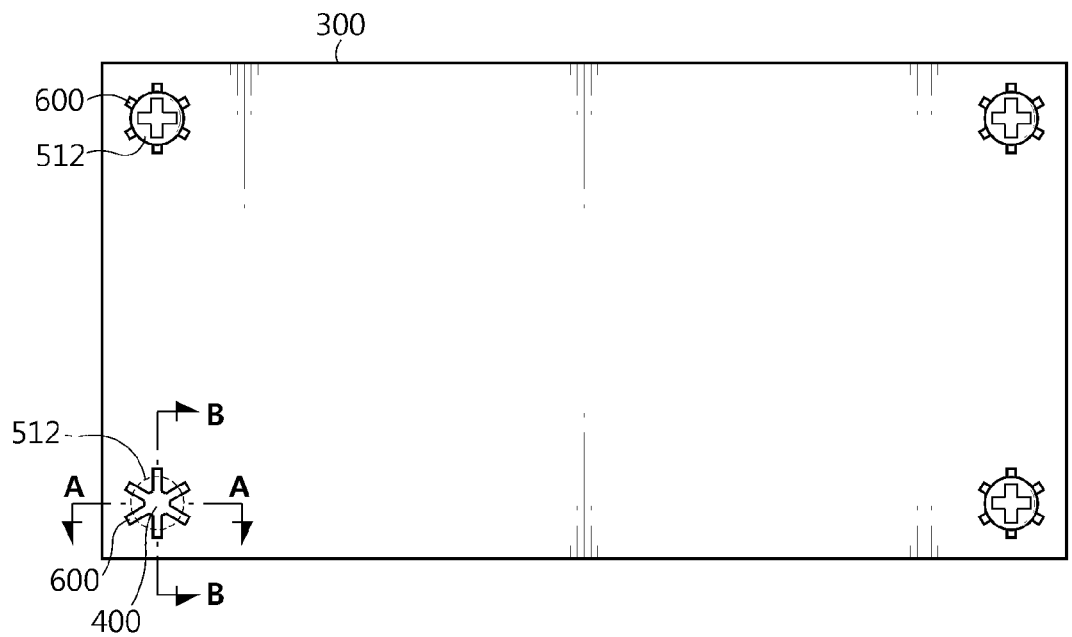
FIG. 3 is a plan view showing a circuit board of the battery module according to an embodiment of the present disclosure.
Figure 4:
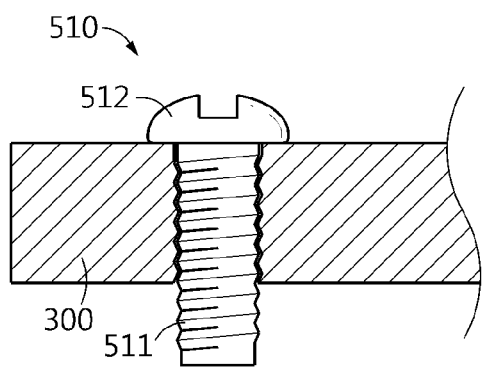
FIG. 4 is a diagram observed along the line A-A of FIG. 3.
Figure 5:
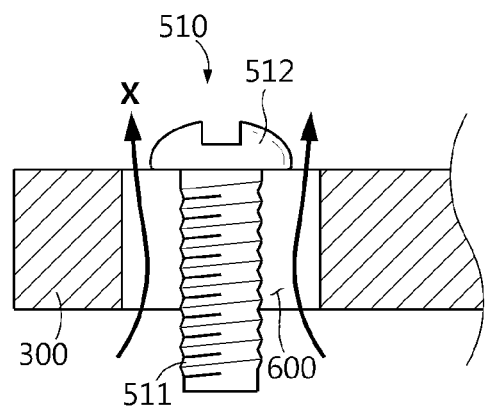
FIG. 5 is a diagram observed along the line B-B of FIG. 3.
Figure 6:
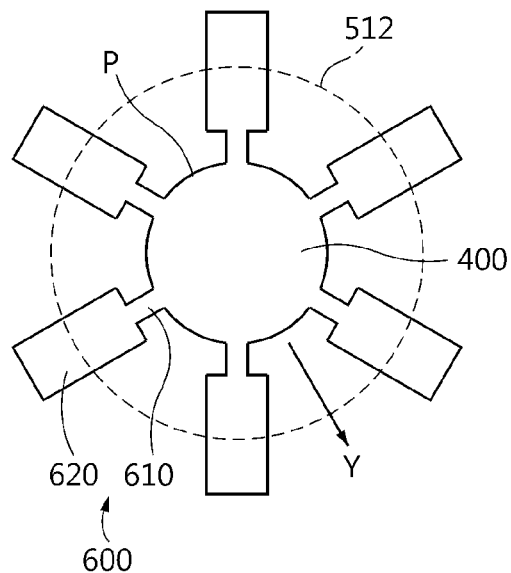
FIG. 6 is a diagram showing a modified embodiment of an expansion hole in the battery module according to an embodiment of the present disclosure.
Figure 7:
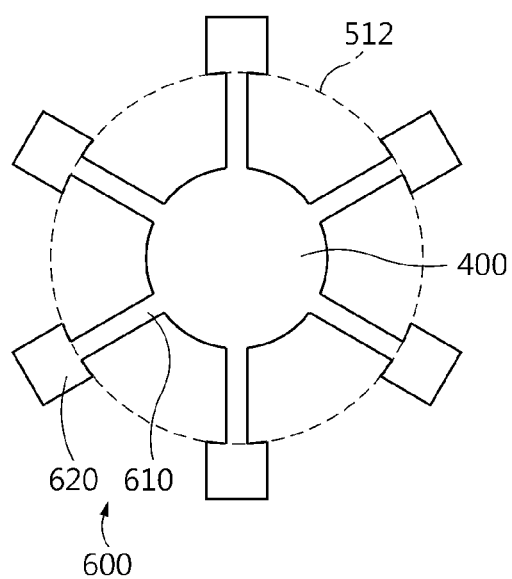
FIG. 7 is a diagram showing another modified embodiment of the expansion hole in the battery module according to an embodiment of the present disclosure.

FIG. 2 is an exploded perspective view schematically showing a battery module according to an embodiment of the present disclosure, FIG. 3 is a plan view showing a circuit board of the battery module according to an embodiment of the present disclosure, FIG. 4 is a diagram observed along the line A-A of FIG. 3, FIG. 5 is a diagram observed along the line B-B of FIG. 3, FIG. 6 is a diagram showing a modified embodiment of an expansion hole in the battery module according to an embodiment of the present disclosure, and FIG. 7 is a diagram showing another modified embodiment of the expansion hole in the battery module according to an embodiment of the present disclosure.

Referring to the drawings, a battery module 10 according to an embodiment of the present disclosure includes a battery cell stack 100, a case 200, a circuit board 300, a mounting hole 400, and an expansion hole 600.

The battery cell stack 100 may include a plurality of battery cells 110 provided with electrode leads. The electrode lead provided to the battery cell 110 is a kind of terminal exposed to the outside and connected to an external device and may be made of a conductive material. The electrode lead may include a positive electrode lead and a negative electrode lead. The positive electrode lead and the negative electrode lead may be disposed at opposite sides of the battery cell 110 in the longitudinal direction, or the positive electrode lead and the negative electrode lead may be disposed at the same side of the battery cell 110 in the longitudinal direction. The electrode lead may be electrically coupled to a bus bar. The battery cell 110 may have a structure in which a plurality of unit cells, in each of which a positive electrode plate, a separator and a negative electrode plate are arranged in order, or a plurality of bi-cells, in each of which a positive electrode plate, a separator, a negative electrode plate, a separator, a positive electrode plate, a separator and a negative electrode plate are arranged in order, are stacked suitable for a battery capacity.

The battery cell stack 100 may be configured such that a plurality of battery cells 110 are stacked on each other. Here, the battery cell 110 may have various structures, and the plurality of battery cells 110 may be stacked in various ways.

The battery cell stack 100 may include a plurality of cartridges (not shown) for respectively accommodating the battery cells 110. Each cartridge (not shown) may be manufactured by injection-molding plastic, and a plurality of cartridges (not shown), each having an accommodation portion capable of storing the battery cell 110, may be stacked. A cartridge assembly in which the plurality of cartridges (not shown) are stacked may have a connector element or a terminal element. The connector element may include, for example, various types of electrical connection parts or members for connection to a battery management system (BMS) that may provide data on voltage or temperature of the battery cell 110. In addition, the terminal element includes a positive terminal and a negative terminal as main terminals connected to the battery cell 110, and the terminal element may have a terminal bolt to be electrically connected to the outside. Meanwhile, the battery cell 110 may have various shapes.

The case 200 is configured to accommodate the battery cell stack 100. Here, the case 200 may be configured to surround the battery cell stack 100. That is, in the case 200, the battery cell stack 100 or the cartridge assembly accommodating the battery cell stack 100 may be stored. That is, the case 200 surrounds the battery cell stack 100 or the plurality of cartridge assemblies entirely, thereby protecting the battery cell stack 100 or the cartridge assemblies from external vibration or impact.

The case 200 may be shaped corresponding to the shape of the battery cell stack 100 or the cartridge assembly. For example, if the battery cell stack 100 or the cartridge assembly is provided in a hexahedral shape, the case 200 may also be provided in a hexahedral shape to correspond thereto.

The case 200 may be manufactured by, for example, bending a metal plate, or using an injection-molded plastic. In addition, the case 200 may be manufactured as an integral type, or may be manufactured as a separable type.

The case 200 may have a perforated portion (not shown) formed therein so that the connector element or the terminal element may be exposed therethrough to the outside. That is, the connector element or the terminal element may be electrically connected to a predetermined external component or member, and the perforated portion may be formed in the case 200 so that the electrical connection is not disturbed by the case 200.

The case 200 may include an upper case 210, a lower case 220, and a side case 230, but is not limited thereto.

The circuit board 300 is disposed at and coupled to the case 200. The circuit board 300 may be coupled to the case 200 at various locations. Referring to FIG. 2, the circuit board 300 is coupled to the upper case 210, but this is an example and the present disclosure is not limited thereto. If the circuit board 300 is coupled to the upper case 210, a housing (not shown) for protecting the case 200 may be further provided.

The mounting hole 400 is formed in the circuit board 300 so that the fastening member 500 is inserted therein to fix the circuit board 300. The mounting hole 400 may be provided in various ways, and, for example, the mounting hole 400 may be provided as a circular hole.

In addition, the fastening member 500 may also be provided in various ways, but hereinafter, it will be described that the fastening member 500 is a screw 510. In addition, a thread may be formed at the circuit board 300 so as to be fastened to the screw 510, but the thread of the circuit board 300 is not shown in the drawings. The screw 510 may include a screw body 511 and a screw head 512. The screw body 511 is inserted into the mounting hole 400 of the circuit board 300 to fix the circuit board 300. The screw head 512 is coupled to the screw body 511.

Referring to FIG. 3, the expansion hole 600 extends from the mounting hole 400. In addition, referring to FIG. 5, the expansion hole 600 is provided as a perforated hole to perforate the circuit board 300 entirely. Here, referring to FIGS. 3 and 5, when the screw body 511 described above is inserted into the mounting hole 400 and fastened thereto, at least a part of the expansion hole 600 is located out of the screw head 512.

If the expansion hole 600 extending from the mounting hole 400 is located out of the screw head 512 in this way, air may flow through the expansion hole 600 as shown in FIG. 5. That is, the air flowing by convection may move through the expansion hole 600 (see an arrow X in FIG. 5) and cool the circuit board 300 with a high temperature.

Referring to FIG. 3, the expansion hole 600 may be provided in plural, and the plurality of expansion holes 600 may be formed to extend radially from the mounting hole 400. The plurality of expansion holes 600 are formed radially even in modified embodiments of FIGS. 6 and 7, explained later. However, the plurality of expansion holes 600 are not necessarily arranged radially.

Referring to FIG. 6, which is a modified embodiment of the expansion hole 600, the expansion hole 600 may include a first hole 610 and a second hole 620. Here, the first hole 610 may be a hole extending from the mounting hole 400, the second hole 620 may be a hole extending from the first hole 610, and the first hole 610 and the second hole 620 may be formed to have different widths.

For example, as shown in FIG. 6, the width of the first hole 610 may be smaller than the width of the second hole 620. As shown in FIG. 3, in the case where the overall width of the expansion hole 600 is the same, if the width of the expansion hole 600 is too large, the total area of the thread of the circuit board 300 fastened to the screw body 511 decreases, so the fastening rigidity of the screw body 511 may be reduced. Meanwhile, if the width of the expansion hole 600 is too small for the fastening rigidity of the screw body 511, air may not flow smoothly.

In this consideration, the expansion hole 600 is configured to include the first hole 610 and the second hole 620 with different widths. Also, for the fastening rigidity of the screw body 511, the first hole 610 is formed to have a smaller width than the second hole 620, and, for smooth air flow, the second hole 620 is formed to have a larger width than the first hole 610.

That is, in FIG. 6, in order to increase the area of the portion (see a portion P in FIG. 6) of the circuit board 300 that is fastened to the screw body 511, the width of the first hole 610 is formed relatively smaller than the width of the second hole 620 to increase the fastening rigidity of the screw body 511 and the circuit board 300.

However, if there is no serious problem in the fastening rigidity of the screw 510 and the air flow, the expansion hole 600 having the same width as shown in FIG. 3, which is easy to manufacture, may be used.

In addition, based on a longitudinal direction extending radially from the mounting hole 400 (refer to an arrow Y in FIG. 6), the first hole 610 may be formed to have a smaller length than the second hole 620. Since the width of the first hole 610 is smaller than the width of the second hole 620 as described above, as the length of the second hole 620 is longer, the flow space through which air may flow is widened.

In FIG. 6, a part of the second hole 620 is covered by the screw head 512, but a perforated hole is formed in a lower part of the screw head 512 by the second hole 620, so air may flow through the perforated hole. Thus, even though a part of the second hole 620 is covered by the screw head 512, air may flow smoothly.

Therefore, if the second hole 620 is formed to have a larger length than the first hole 610, the amount of air flow increases, thereby increasing the cooling efficiency.

Referring to FIG. 7, which is another modified embodiment of the expansion hole 600, the first hole 610 of the expansion hole 600 is formed to have a smaller width than the second hole 620, so that based on an edge of the screw head 512, the first hole 610 is disposed inner than the edge of the screw head 512 and the second hole 620 is disposed outer than the edge of screw head 512. FIG. 7 shows an embodiment in which the fastening rigidity of the screw body 511 is more important, compared to FIG. 6.

Hereinafter, the operations and effects of the battery module 10 according to an embodiment of the present disclosure will be described with reference to the drawings.

The screw 510 is inserted through the mounting hole 400 formed in the circuit board 300 to fix the circuit board 300 to the case 200. Here, the expansion hole 600 is formed to extend from the mounting hole 400, where an upper side of the mounting hole 400 is blocked by the screw head 512 but at least part of the expansion hole 600 is located out of the screw head 512, thereby securing an opened state.

In addition, since the expansion hole 600 is provided as a perforated hole that perforates the circuit board 300 entirely, air may flow through the opened expansion hole 600 and cool the circuit board 300.

Meanwhile, the first hole 610 extends from the mounting hole 400, the second hole 620 extends from the first hole 610, and the first hole 610 may be formed to have a smaller width than the second hole 620. In addition, based on a longitudinal direction extending radially from the mounting hole 400, the first hole 610 may be formed to have a smaller length than the second hole 620.

With this configuration, the screw body 511 may be fastened to the circuit board 300 to have sufficient rigidity, and also the circuit board 300 may be effectively cooled.

Meanwhile, a battery pack (not shown) according to an embodiment of the present disclosure may include at least one battery module 10 according to an embodiment of the present disclosure. Also, in addition to the battery modules 10, the battery pack (not shown) may further includes a case for accommodating the battery modules 10, and various devices for controlling charge and discharge of the battery modules 10, such as a BMS, a current sensor, a fuse, and the like.

Meanwhile, a vehicle (not shown) according to an embodiment of the present disclosure may include the battery module 10 or the battery pack (not shown) described above, and the battery pack (not shown) may include the battery module 10. In addition, the battery module 10 according to an embodiment of the present disclosure may be applied to the vehicle (not shown), for example a predetermined vehicle (not shown) provided to use electricity such as an electric vehicle or a hybrid electric vehicle.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

INDUSTRIAL APPLICABILITY

The present disclosure relates to a battery module, and a battery pack and a vehicle including the battery module, and may be used in industries related to batteries.

What is claimed is:

1. A battery module, comprising:
a battery cell stack in which a plurality of battery cells are stacked;
a case configured to accommodate the battery cell stack;
a circuit board disposed at the case;
a mounting hole formed in the circuit board and configured to receive a fastening member therein to fix the circuit board to the case; and
an expansion hole formed in the circuit board and extending from the mounting hole.

2. The battery module according to claim 1,
wherein the expansion hole is a perforated hole formed to perforate an area of the circuit board around the mounting hole entirely.

3. The battery module according to claim 1,
wherein the fastening member is a screw, and
wherein the mounting hole and expansion hole are configured such that, when a screw body of the screw is inserted into and fastened to the mounting hole, at least a part of the expansion hole is not covered by a screw head of the screw.

4. The battery module according to claim 3,
wherein the battery module includes a plurality of expansion holes, and
the plurality of expansion holes to extend radially from the mounting hole.

5. The battery module according to claim 3,
wherein the expansion hole includes:
a first hole portion extending from the mounting hole; and
a second hole portion extending from the first hole and having a different width than the first hole.

6. The battery module according to claim 5,
wherein the first hole portion has a smaller width than the second hole portion.

7. The battery module according to claim 6,
wherein based a length direction of the expansion hole extends radially from the mounting hole, and the first hole portion has a smaller length than the second hole portion in the length direction.

8. The battery module according to claim 6,
wherein an outer edge of the first hole portion is positioned radially inward from an outer edge of the screw head and an outer edge of the second hole portion is positioned radially outward from the outer edge of the screw head.

9. The battery module of claim 3, further comprising the fastening member.

10. The battery module of claim 1, wherein the battery module comprises a plurality of mounting holes, each mounting hole including one or more corresponding expansion holes.

11. The battery module of claim 10, wherein the battery module includes a mounting hole and one or more corresponding expansion holes at each corner of the circuit board.

12. The battery module of claim 1, wherein the expansion hole is configured to permit air to flow therethrough while the circuit board is fixed to the case by the fastening member.

13. A battery pack, comprising the battery module according to claim 1.

14. A vehicle, comprising the battery module according to claim 1.

* * * * *